Sept. 11, 1928.

A. M. STANLEY 1,683,738

DISK WHEEL AND METHOD OF MAKING THE SAME

Filed Oct. 3, 1925

Witness
Frederick S. Grumbach

Inventor
Arthur M. Stanley
by his attorneys
Van Everen Fish Hildreth & Carr

Patented Sept. 11, 1928.

1,683,738

UNITED STATES PATENT OFFICE.

ARTHUR M. STANLEY, OF LYNN, MASSACHUSETTS, ASSIGNOR TO STANLEY STEEL WELDED WHEEL CORPORATION, OF BOSTON, MASSACHUSETTS, A CORPORATION OF DELAWARE.

DISK WHEEL AND METHOD OF MAKING THE SAME.

Application filed October 3, 1925. Serial No. 60,266.

The present invention relates to automobile wheels and methods of making the same, and more particularly to wheels of the disk type.

The principal object of the present invention is to provide a wheel of this general type which is of light, strong and durable construction and attractive in appearance.

Another object of the present invention is to provide a disk wheel construction adapted for convenient replacement of wood wheels without radical alterations in the existing construction of the hub or axle connections of the automobile.

A further object of the invention is to provide a conveniently demountable disk wheel carrying a fixed rim, particularly with the view of accommodating a rim of the so-called drop center type.

With these and other objects in view, as will hereinafter appear, the present invention contemplates the provision of a double disk wheel construction consisting of an inner and an outer disk of pressed steel maintained in assembled spaced relation near the center or hub portion of the disk. The use of two disks in this fashion provides an arched wheel construction which lends considerable strength to the wheel by use of material of relatively light weight and permits design of the exposed parts to give a highly attractive appearance. The disks at their periphery are secured, as by welding, to a rim, preferably of the drop center type, which lends itself readily to the attachment of the disks thereto. The disks are preferably secured together at a point between the periphery and the center of the wheel by means of a series of spot welds, and the spaced relation at the center, which gives the arched construction, is maintained by an internal bracing member which is secured to one of the disks before assembly of the wheel.

Other features of the invention consist in certain novel features of construction, combinations and arangements of parts hereinafter described and particularly defined in the claims.

Figure 1:
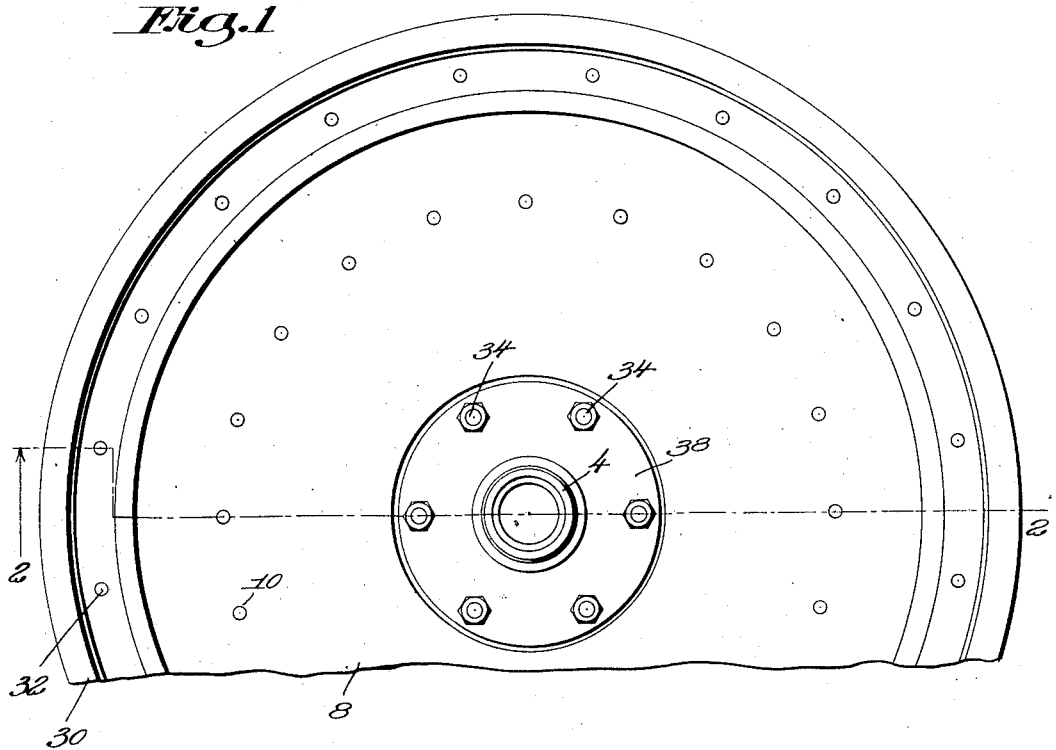
Figure 2:
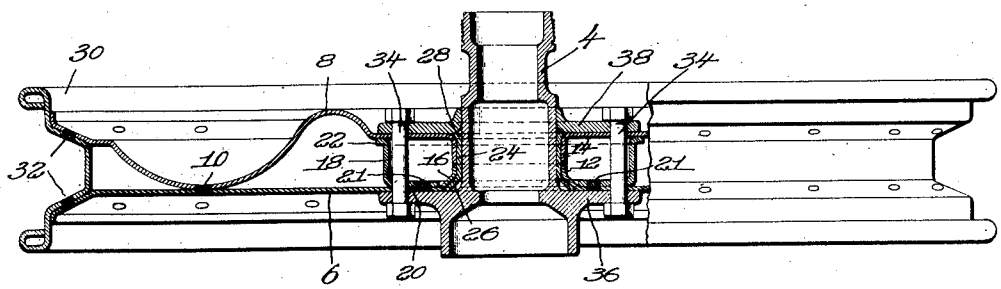

In the accompanying drawings, Fig. 1 is a side elevation of a portion of a wheel embodying the several features of the present invention; and Fig. 2 is a view of the wheel partly in section on line 2—2 of Fig. 1.

The embodiment of the invention illustrated in the drawings is adapted to be used in connection with a hub of the type commonly used with wooden wheels and is particularly adapted for use in replacement of a wooden wheel by removal of the spokes and felly from the original wheel. The hub 4, as shown in Fig. 2 is of this general type as commonly used with wooden wheels and is adapted to be secured to the axle of the vehicle in any usual or preferred manner. The wheel comprises two disks 6 and 8, of relatively thin sheet steel, the former or inner disk being substantially flat, and the latter or outer disk being curved, as shown in Fig. 2, to engage with the inner disk along an annular line 10 intermediate the periphery and center of the wheel. The disks are maintained in separated relation near the center by the provision of abutting inturned annular portions indicated at 12 and 14 for the inner and outer disks respectively, the portion 12 of the inner disk being formed with a flare 16 at its junction with the disk proper, as clearly shown in Fig. 2. The spaced relationship of the disks at the center is further maintained by means of an annular bracing member 18 having a base 20 which is spot welded at a series of points 21 to the interior surface of the inner disk and an upstanding portion extending toward the outer disk, this upstanding portion being provided with an annular flange 23 against which the interior surface of the outer disk is adapted to engage. In order to maintain the disks firmly in assembled relationship, they are spot welded together at a series of points where they engage along the line 10, and they are secured at the center by means of a collar, or bushing, 24 received within the inturned abutting portions of the disks, this bushing being of the proper internal diameter to fit closely upon the hub 4. The collar is formed at its inner end with an outwardly flaring portion 26 adapted to engage with the flare 16 of the inner disk, and the outer end of the collar, after insertion, is formed with a struck-over portion 28 which engages the outer surface of the disk 8, thereby firmly maintaining the central portions of the disks together against the spacing member 18. At the periphery of the disks is secured a rim 30 of the drop center type by means of a series of spot welds 32 connecting the disks with the sloping depressed central portions of the rim. The wheel is adapted to be secured in place on the hub by a series of bolts 34 extending through openings in a flange 36 of the hub and through suitable openings in the wheel. The bolts also extend through a removable face plate 38 which closely surrounds the hub and bears against the outer disk 8 of the wheel, the entire assembly being maintained in proper position on the hub by means of suitable nuts received on the bolts and engaging with the plate 38.

The sequence of operations in the manufacture of the wheel is described as follows: The disks are pressed from sheet steel of the requisite thickness in the shape shown in Fig. 2. The annular bracing member 18 is next secured to the interior surface of the inner disk by the spot welds as above described. Both disks are then assembled about the rim 30 and are secured to the rim by the spot welds 32 extending around the periphery of the wheel, the disks being also welded together along the line 10 at this time. The bushing 24 is next inserted within the inturned central portions of the disks from the inner side thereof until the outwardly flaring portion 26 engages the flare 16 of the inner disk, and the outer end of the collar is struck over by means of a press, or in any other suitable manner, to engage the outer surface of the disk 8. The wheel is then complete and is ready for attachment as above described upon the hub of the vehicle.

It will be seen that the disks are firmly maintained in their proper spaced relationship at the center by virtue of the rigid bracing member 18 as well as by the engagement of the inturned portions of the disks themselves, together with their retaining collar 24. Owing to the arched construction of the wheel by which exceedingly high rigidity is imparted to the wheel, the outer disk 8 may be made of any suitable design to give an attractive appearance, as is illustrated in Fig. 2 showing the outer disk of substantially bowl formation between its point of engagement with the inner disk and its engagement with the bracing member 18.

I claim:

1. An automobile wheel comprising two disks secured together between the periphery and the center, an annular bracing member secured to one of the disks to maintain the disks in spaced relationship at the center, and securing means at the center of the disks.

2. An automobile wheel comprising two disks connected together between the periphery and the center, an annular bracing member welded to the interior surface of one of the disks and engaging the interior surface of the other disk, and securing means for the disks at the center.

3. An automobile wheel comprising two disks connected together between the periphery and the center, an annular bracing member spot welded to the interior of one of the disks and engaging the interior surface of the other disk, and a bushing received within the central portion of the disks and engaging with the faces of the disks to maintain them in spaced relationship.

4. An automobile wheel comprising two disks spot welded together between the periphery and the center, a bracing member spot welded to the interior of one of the disks and engaging the interior surface of the other disk, the disks having inturned abutting central portions, and a bushing received within the inturned portions of the disks and having a struck-over end portion to maintain the disks in assembled relation at the center.

5. An automobile wheel comprising two disks, a rim spot welded to the disks at opposite sides thereof for maintaining the disks in spaced relationship at their periphery, means for maintaining the disks in spaced relation at the center, the disks being secured together along an annular engaging surface between the center and the periphery.

6. An automobile wheel comprising a drop center rim, a disk welded to each side of the depressed central portion of the rim, the disks being secured together on an annular surface between the rim and the center, bracing means between the disks for maintaining the disks in spaced relationship at the center, and securing means for the disks at the center.

7. An automobile wheel comprising two disks secured together along an annular engaging surface intermediate to the center and the periphery, a drop center rim welded at opposite sides to the disks for maintaining the latter in spaced relationship at the periphery, the disks having inturned abutting central portions, an annular bracing member welded to the interior surface of one of the disks and engaging the interior surface of the other disk, and securing means for the disks at the center.

In testimony whereof I have signed my name to this specification.

ARTHUR M. STANLEY.